Nov. 10, 1964  R. A. PAYNTER  3,156,860
VOLTAGE CONTROL CIRCUITS
Filed Sept. 24, 1959  3 Sheets-Sheet 1

INVENTOR:
DONALD A. PAYNTER,
BY *Marvin K. Goldenberg*
HIS ATTORNEY.

INVENTOR:
DONALD A. PAYNTER,
BY Marvin A. Goldenberg
HIS ATTORNEY.

Nov. 10, 1964         R. A. PAYNTER         3,156,860
VOLTAGE CONTROL CIRCUITS
Filed Sept. 24, 1959                                                    3 Sheets-Sheet 3
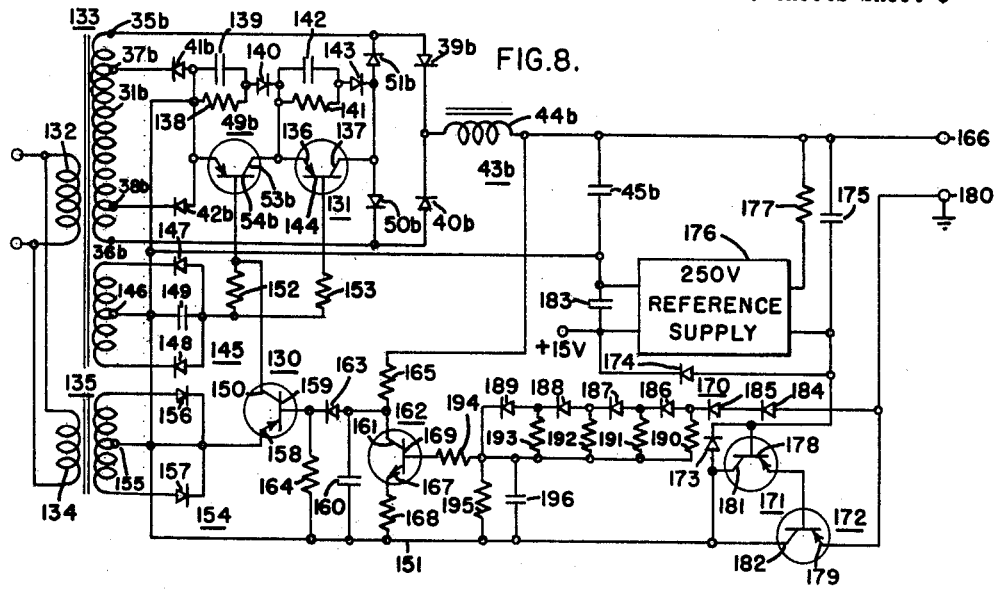
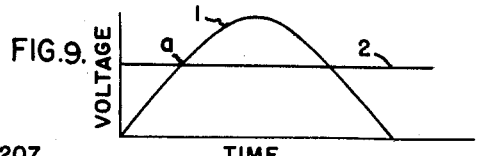
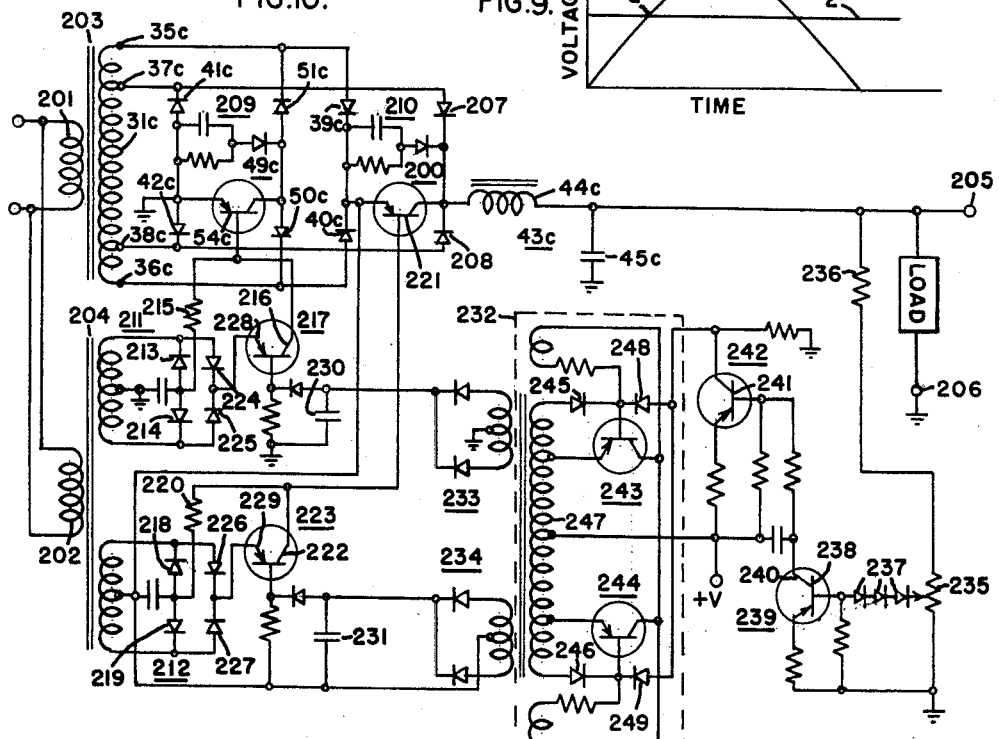
INVENTOR:
DONALD A. PAYNTER,
BY Marvin A. Goldenberg
HIS ATTORNEY.

United States Patent Office 3,156,860
Patented Nov. 10, 1964

3,156,860
VOLTAGE CONTROL CIRCUITS
Donald A. Paynter, Syracuse, N.Y., assignor to General Electric Company, a corporation of New York
Filed Sept. 24, 1959, Ser. No. 842,101
19 Claims. (Cl. 321—18)

This invention relates to novel voltage control circuits wherein a rectified alternating voltage is variably coupled from a tapped transformer to a load, which circuits may be useful as constant voltage sources, as constant current sources or as low frequency amplifiers. One particular application of the invention is direction to a novel voltage regulator system employing semiconductor devices for converting unregulated alternating voltage to a regulated direct voltage output, such systems being useful as compact direct voltage power supplies for electronic equipment.

Voltage regulators commonly employed in direct current power supply work are essentially of two types, being either of a high efficiency switching type, characterized by high efficiency and high power outputs, or of a linear, dissipative kind, characterized by high speed regulation and wherein high accuracy may be more easily obtainable than with the switching type. The high speed voltage regulators normally employ a linear, dissipative network, acting as a variable impedance, connected in series with the load, and as the input voltage varies, or as the load current varies, the voltage drop across the linear dissipative network is caused to compensatingly change so as to maintain a constant load voltage. The high efficiency, high power voltage regulators normally employ switch type voltage control elements which periodically interrupt the rectified direct current which feeds the smoothing output filter element in such a manner that the time average of the rectifier-switch wave that appears at the filter output is the desired output direct voltage level. This form of operation requires that the switch type voltage control element be capable of withstanding at least the full output voltage of the supply, since during the time that the switch is "open" at least this voltage appears across it. Semiconductor or other type switching devices of inherently low inverse voltage capabilities cannot easily be employed in these regulators when high output voltages are desired since they cannot individually tolerate such high voltages. Their use in voltage regulator circuits has, therefore, normally been confined to low voltage applications wherein the output voltage does not exceed their inverse voltage.

Voltage control circuits for use as high efficiency, low frequency amplifiers or as high efficiency constant current sources employing semiconductor or other type switching devices of restricted inverse voltage capabilities are similarly limited to low output voltages. Such circuits have the additionally undesirable feature of requiring relatively large filter components for filtering the interrupted rectified output voltages.

The present invention provides novel voltage control circuits for use in the above and other applications operating as high efficiency circuits and employing semiconductor or other switching devices of limited inverse voltages, with the attendant advantage of supplying output voltages far exceeding said inverse voltages. In addition a reduced filtering of the rectified voltage is also made possible. The disclosed circuits may further be operated in the dissipative mode if desirable.

It is accordingly an object of this invention to provide high efficiency voltage control circuits employing switching devices of restricted inverse voltage capabilities which yield output voltages exceeding said inverse voltages.

It is an additional object of this invention to provide high efficiency voltage control circuits employing switching devices which provide a rectified voltage of reduced second harmonic frequency thereby requiring a smaller filter circuit at the output.

It is another object of this invention to provide a voltage control circuits employing semiconductor switching devices of restricted inverse voltage capabilities useful as low loss, low frequency amplifiers having output voltages exceeding said inverse voltages.

It is a further object of this invention to provide high efficiency voltage control circuits employing semiconductor switching devices of restricted inverse voltage capabilities useful as constant current sources.

It is still a further object of this invention to provide voltage control circuits employing a high efficiency switch type voltage control in which the switching devices are semiconductor elements which are subjected to maximum inverse voltages that are equal to only that voltage necessary for output voltage correction rather than to the entire output voltage.

It is a further object of this invention to provide high efficiency, high power voltage regulator systems employing low loss semiconductor devices wherein the output voltage is substantially higher than the inverse voltages of the semiconductor devices.

It is another object of this invention to provide a voltage regulator system employing low loss semiconductor devices having characteristics of high efficiency and high speed, wherein the output voltage is substantially higher than the inverse voltages of the semiconductor devices.

It is another object of this invention to provide a high efficiency, high speed voltage regulator system for use as a power supply employing a high efficiency switch type voltage control in which the switching devices are semiconductor elements, and further employing linear type voltage control to increaes the speed of response.

Briefly, in accordance with one aspect of the invention, a voltage control circuit is provided wherein a source of alternating voltage is supplied to the primary winding of a power transformer, the secondary winding of which has a plurality of terminals which divide the secondary winding into a plurality of portions. Two full wave rectifying circuits and a semiconductor switch type control device are connected between said terminals and a load, one of said rectifying circuits coupling a first full wave rectified voltage of a first peak amplitude from one portion of said secondary winding to said load and the other of said rectifying circuits coupling a second full wave rectified voltage of a second peak amplitude level from a second portion of said winding to said load. The semiconductor switching device, which experiences a maximum inverse voltage substantially equal to the difference of the two peak amplitude levels, is connected in series with said other rectifying circuit and a source of control signals is applied thereto to cause the switching device to couple said first or second full wave rectified voltage to said load, the switching action being controlled so that the output voltage is equal to the time averaged value of said first and second full wave rectified voltages. The two full wave rectifying circuits may be realized by employing a bridge type rectifying circuit with a continuous winding or by employing half wave rectifiers in conjunction with paired secondary windings.

According to another aspect of the invention an extended range of control is provided by effectively cascading additional switching devices cooperating with additional windings.

In accordance with another aspect of the invention for sensing load and input conditions, the source of control signals includes a comparator circuit which provides pulsed control signals that are a function of said conditions.

Although the features of the invention which are believed to be novel are set forth with particularly in the appended claims, the invention itself, both as to its organization and method of operation, together with further objects and advantages thereof, may best be understood by reference to the following description taken in connection with the accompanying drawings wherein:

FIGURE 8 is a schematic diagram of a further embodiment of applicant's voltage regulator system employing the transformer tap circuit illustrated in FIGURE 2, and having a transistorized feedback circuit that includes a linear series regulator;

FIGURE 9 is a graph illustrating the voltage waveforms appearing at the emitter and base electrodes of the comparator transistor of FIGURE 8; and FIGURE 10 is a schematic diagram of another embodiment of applicant's voltage regulator system employing a transformer tap circuit having an extended range of control.

Figure 1:
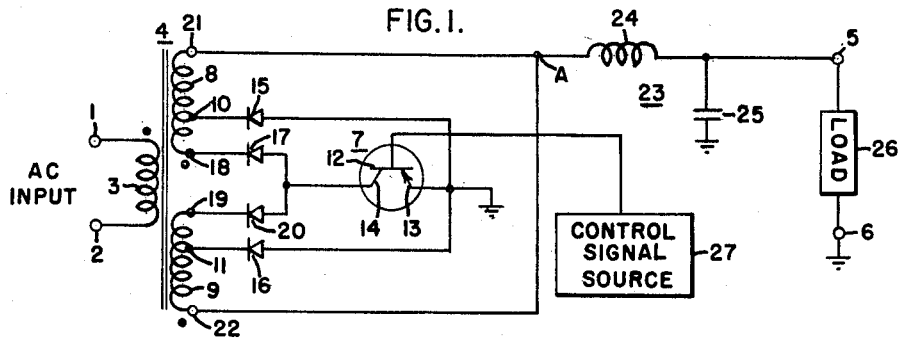
FIGURE 1 is a schemtaic diagram of a voltage control circuit incorporating the principles of the invention employing two secondary transformer windings.

Referring now to FIGURE 1 of the drawings, there is shown a circuit diagram of one embodiment of a novel voltage control circuit, comprising two full wave rectifier circuits and a control device, normally acting as a switch, which may be used as a voltage regulator circuit, as a constant current source or as a low frequency amplifier. An alternating input voltage is supplied to the input terminals 1 and 2 of primary winding 3 of transformer 4, which may be a single phase power transformer, and a controlled direct voltage is obtained at the output terminals 5 and 6. A feature of the invention is the use of a semiconductor control device, which may be of inherently low inverse voltage capability as compared to the output voltage, taking the form of a switch and illustrated as a switch operated transistor 7. For example, a transistor having an inverse voltage of 60 volts can be utilized in a power supply circuit to control a 200 volt direct current output where there are approximately plus or minus 10 percent variations in the alternating current line input voltage or in the load.

The secondary of transformer 4 is comprised of two windings 8 and 9, which are shown to be wound with the same polarity as illustrated by the "dot." The end terminals 21 and 22 are commonly joined at point A and the intermediate terminal taps 10 and 11 are respectively coupled to ground by means of a first pair of diodes 15 and 16, which provides a full wave rectification of the voltage induced in the portions of the winding between terminals 10–21 and 11–22. A second pair of diodes 17 and 20 are coupled to the end terminals 18 and 19 of the secondary winding and are each connected in series with the emitter-collector path of transistor 7, which comprises base 12, emitter 13 and collector 14. Collector 14 is connected to the anodes of diodes 17 and 20, grounded emitter 13 is connected to the anodes of diodes 15 and 16, and base 12 is connected to a source of control signals 27. When the transistor is in the conductive state, it may be seen that diodes 17 and 20 provide full wave rectification of the voltage developed in the entire winding. During the time diodes 17 and 20 are conducting diodes 15 and 16 do not conduct since end terminals 18 and 19 assume substantially ground potential, the voltage drop across the transistor 7 and diodes 17 and 20 being very small, and the induced winding voltage between terminals 10–18 and 11–19 provide a voltage considerably higher than ground at terminals 10 and 11. When the transistor is nonconductive, current flow will be through diodes 15 and 16 and only the portions of windings 8 and 9 that extend between terminals 10 and 21 and terminals 11 and 22, the voltage induced in these portions being substantially equal in most applications. These voltages, however, may readily be of unequal value if desired. Thus the output voltage of this full wave rectifier circuit is a pulsating positive direct voltage whose peak amplitude varies between two values. Joined terminals 21 and 22 are connected to the input side of choke input filter circuit 23, comprising inductor 24 and capacitor 25, which smooths out and reduces the harmonic content of the rectifier output waveform to a reasonable value of ripple at the load 26. The load is connected across capacitor 25 between output terminals 5 and 6. Another form of filter might be appropriate such as an RC or a capacitive input LC filter, but the choke input form is preferred.

As a switching device, the transistor is biased fully conductive or nonconductive by the control source 27, the output of which may be a pulsed voltage varying between a positive and negative value. The source may be independently or automatically controlled. For purposes of illustration only, when providing a predetermined output voltage or current to the load, the control source may take the form of a conventional triggered bi-stable multivibrator circuit, the width of the pulsed output being controlled by the trigger input. More refined control circuits which automatically adjust the conduction of the switching transistor in accordance with the load condition are disclosed with relation to the regulator systems of FIGURES 5, 8 and 10. When operating the circuit as an amplifier, the control source may comprise a low frequency alternating signal applied through a comparator circuit, which will be further described in relation to FIGURE 8. When the transistor is conductive, or in the "on" condition, it is driven into saturation by the bias current from the control source and is an effective short circuit. When nonconductive, in the "off" condition, it is an effective open circuit. The transistor is switched "on" and "off" at a rapid rate with the percentage of "on" time arranged so that the direct voltage output is averaged in the output filter to provide the desired or rated value.

Considering now the operation of the circuit with transistor 7 acting as a switch, a controlled direct voltage may be supplied to the load 26 by alternately coupling into the circuit by means of the transistor either the entire voltage induced in the secondary windings 8 and 9 or a portion of this voltage, rectifying the voltage, and obtaining a time average of the rectified voltage by means of the filter circuit 23 whose time constant is sufficient to provide such time average. The duty cycle of the transistor operation, which is the proportion of the time it is in the conductive condition as compared to the time it is in the nonconductive condition, or which may be expressed as the percentage of the period of each half cycle of alternating voltage it is conducting, is controlled and provides the desired output voltage.

Figure 6:
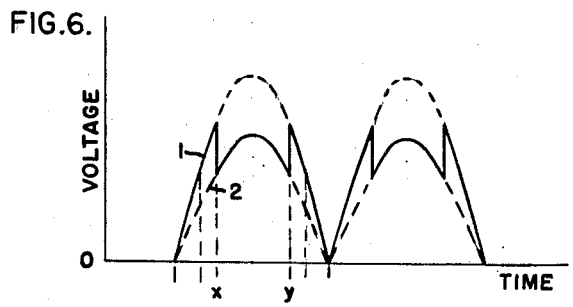
FIGURE 6 is a graph illustrating the waveform at the rectifier output of FIGURE 5.

If the duty cycle of transistor 7 assumes a first value under the influence of a given signal from the source 27, a first value of output voltage will be provided. The circuit will act in the following manner. With a positive cycle of the input alternating voltage applied to terminal 1 and with the transistor conducting, the secondary current will flow from terminal tap 22 through the filter circuit, through the load to ground, through the transistor 7, through diode 20, which is in its conductive state, to tap 19. When the transistor is switched to the nonconductive state, the current will flow in a similar circuit to the load, but from ground though diode 16 to tap 11, bypassing the winding portion between taps 19 and 11. During the opposite cycle a similar path is taken by the load current, through the lower winding 8 and diodes 15 and 17. Thus, depending upon the conductive state of the transistor, either the voltage induced in the entire windings 8 and 9, save for minor voltage drops across the transistor and the diodes, or the voltage induced in but a portion of the windings, is alternately coupled to the load at a rate determined by the duty cycle of the transistor. The rectified output voltage appearing at point A will then be of a first peak amplitude level when the voltage in the entire secondary windings is coupled into the circuit, and may be illustrated as curve 1 in FIGURE 6, and will be of a second peak amplitude level when only a portion of the secondary voltage is coupled into the circuit, illustrated as curve 2 in FIGURE 6. The switching may preferably occur within each half cycle period, as shown at points X and Y, or every several cycles.

If the control signal to the base 12 of transistor 7 is now made variable, the duty cycle of the transistor will be accordingly varied to provide a controlled output. Thus with the voltage control circuit functioning as a regulated constant voltage supply, the control signal may sense the output voltage and decreases the duty cycle when the output voltage tends to rise thus maintaining a predetermined constant output and, conversely, increase the duty cycle for any tendency of the output voltage to fall. Increasing the duty cycle couples the first peak amplitude voltage to the output for a greater percentage of the total time, whereas decreasing the duty cycle couples the second peak amplitude voltage to the output for a greater percentage of the time. A similar control is obtained when operating the voltage control circuit as a constant current source, except that the control signal then senses the output current and provides a signal to maintain a predetermined constant current output. When operating as a low frequency amplifier, the signal to be amplified actuates the control signal that is applied to the base 12. The upper limit of the frequency of the input signal is the frequency of the alternating voltage power source applied to the terminals 1 and 2.

It is seen that using the circuit of FIGURE 1, high efficiency operation is attained since there is very little power loss in the transistor when operated as a switch. Nevertheless, it is possible to control high direct output voltages with a relatively low voltage transistor because the inverse voltage experienced by the transistor is no greater than the winding voltage appearing between terminals 10 and 18 or 11 and 19 of the windings 8 and 9 respectively. In addition, when the transistor is operated to switch within each half cycle period, the waveform of the obtained rectified voltage which has a notched portion corresponding to a reduction in the second harmonic component of the alternating voltage, shown in FIGURE 6, requires smaller filter components than would a conventional full wave rectified voltage.

In some applications it may be desirable to operate the transistor device as a linear or dissipative element, losing the advantage of high efficiency operation but gaining in reducing the complexity of the control signal source. The transistor device then performs as a variable resistance in series with the load, its resistance varying with the control signal applied to the base so as to yield the rated value of load voltage. The operation of the circuit is as before with the transistor conductive, except that now an appreciable voltage drop is across the transistor. The control source 27 in this instance provides a variable negative current which may be a function of the load or an independent source, that maintains the transistor in the conductive state but varies its conductivity. The control source may be independently controlled or automatically controlled in response to the load voltage. In addition to allowing a simplified control signal source, an advantage of the circuit of FIGURE 1 when operated in this manner is that the voltage across the transistor will not exceed its inverse voltage capabilities, since before this happens the transistor will be shorted out of the circuit by diodes 15 and 16. Thus protection is afforded to the transistor. It should be understood that in each of the embodiments described herein linear operation of the transistor may be resorted to if desired. However, since the more significant advantages flow from the high efficiency switching mode of operation, the remaining description will allude primarily to this latter operation.

Figure 2:
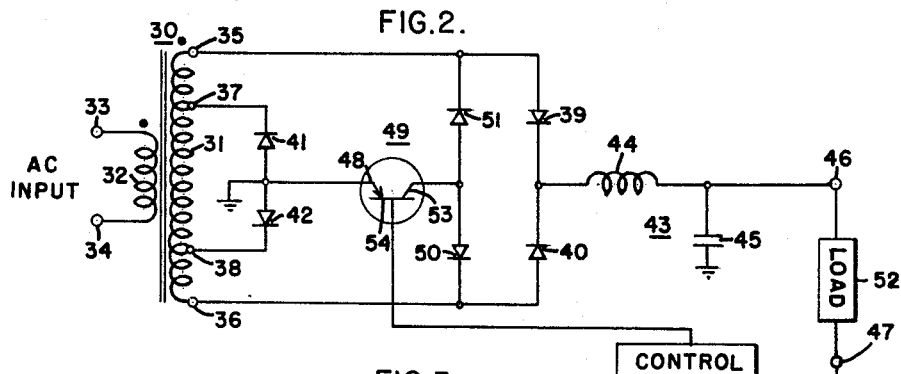
FIGURE 2 is a schematic diagram of a voltage control circuit in accordance with the invention employing a single secondary transformer winding.

FIGURE 2 illustrates another embodiment of applicant's voltage control circuit which is of similar configuration to the circuit of FIGURE 1, but wherein a transformer 30 having a single secondary winding 31 is employed in conjunction with a rectifier bridge modified in accordance with the present invention. This circuit is readily adaptable to existing power supply circuits. The transformer 30 includes primary winding 32 having input terminals 33 and 34, and secondary windings 31 having output terminals 35, 36 and intermediate terminal taps 37, 38.

A first full wave rectifier bridge circuit composed of diodes 39, 40, 41 and 42 couples a rectified voltage of a first peak amplitude level through filter circuit 43, comprising inductor 44 and capacitor 45, which is similar to filter circuit 23 of FIGURE 1, to output terminals 46 and 47, connected as in FIGURE 1. Diodes 39 and 42 conduct during one half cycle of the alternating input voltage and diodes 40 and 41 conduct during the opposite half cycle. The anodes of diodes 39 and 40 are connected respectively to terminals 35 and 36, the cathodes being commonly connected to the input of inductor 44. The cathodes of diodes 41 and 42 are connected respectively to terminal taps 37 and 38, the anodes being commonly connected to ground and to the emitter 48 of transistor 49, illustrated as a PNP type but which might readily be of another form. Thus that portion of the secondary winding 31 between terminals 35 and 38, and that portion between terminals 36 and 37, the voltage in the two portions normally being substantially equal, are connected into the circuit.

A circuit comprising transistor 49 and diodes 50 and 51 in combination with diodes 39 and 40 provides a second full wave rectifier bridge circuit which couples a rectified voltage of a second peak amplitude level to the filter circuit and thence to load 52. Collector electrode 53 is connected to the junction of the anodes of diodes 51 and 50, the cathodes of diodes 51 and 50 being respectively connected to terminals 35 and 36. Base 54 is connected to a source of control signals 55 which controls the conduction of the transistor. Thus when transistor 49 is in the conductive state diodes 41 and 42 are biased nonconductive and the entire secondary winding is connected into the circuit. The control signal source 55 is similar to the control source 27 of FIGURE 1.

The operation of the circuit of FIGURE 2 is similar to that of FIGURE 1. In FIGURE 2 with the primary and secondary windings of transformer 30 poled in the same direction as shown, during the positive half cycle of the input voltage applied to input terminal 33, a voltage will be induced in the secondary winding such as to cause current to flow out of terminal 35 through diode 39, through filter circuit 43, to the load 52 and thence to ground. Considering the preferred low loss switch operation of the transistor 49, with the transistor in the conductive state, the current will continue to flow through the transistor to terminal 36 of the secondary winding by way of rectifying diode 50. During the negative half cycle of the input voltage, the voltage induced in the secondary winding will cause current to flow out of terminal 36, through rectifying diode 40, through the filter circuit, to the load, back to ground, through the transistor and through rectifying diode 51 to the other side of the secondary winding at terminal 35. Therefore, as long as the transistor 49 is conductive, the entire voltage induced in the secondary winding, save for negligible voltage drop across the transistor and rectifying diodes, is applied to filter 43 as a full wave rectified voltage of a first peak amplitude level. The waveform of this voltage, being similar to that obtained from the circuit of FIGURE 1, may also be illustrated as curve 1 in FIGURE 6.

With the transistor in the nonconductive state, the current path extends from terminal taps 35 or 36 through the load to ground, as described above, and thence through either rectifying diodes 41 or 42, depending upon which half cycle of voltage input is being considered. In this manner during the positive half cycle of input voltage at terminal 33, only the portion of the voltage induced in the secondary winding between terminals 35 and 38 will be delivered to the output terminals, and during the negative half cycle of the input voltage, only that portion of the voltage between terminals 36 and 37 will be coupled to the output terminals. A full wave rectified voltage of a second peak amplitude level is thereby coupled to filter 43, the waveform of which may be illustrated by curve 2 of FIGURE 6. The filter provides a time averaged direct voltage of said first and second rectified voltages to the output terminals and thus to load 52. The transistor is controlled as previously explained with reference to FIGURE 1. Again, in the configuration of FIGURE 2 as in that of FIGURE 1, the inverse voltage experienced by the transistor is equivalent to only the voltage appearing between tapped portions of the secondary winding.

Figure 3:
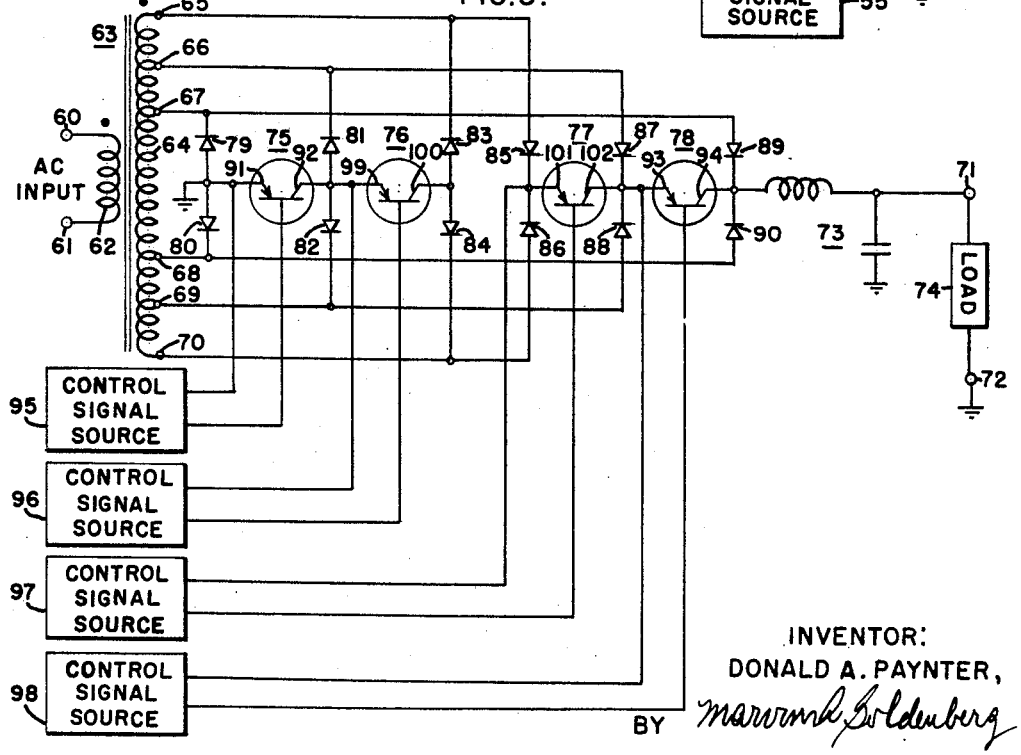
FIGURE 3 is a schematic diagram of a modification of applicant's voltage control circuit having an extended range of control.
Figure 4:
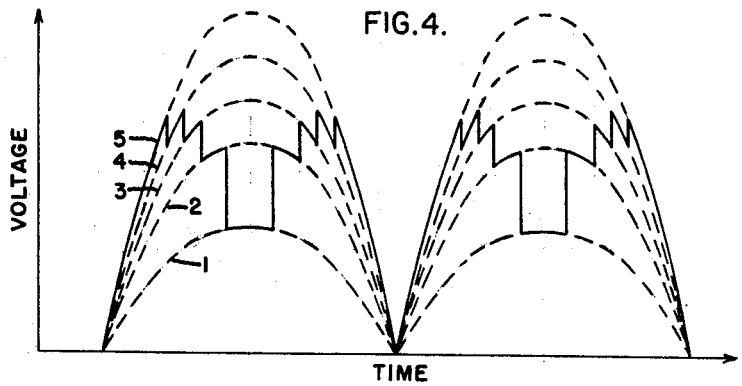
FIGURE 4 is a graph illustrating the waveform at the rectifier output of a voltage control circuit employing multiple switches and multiple transformer taps such as illustrated in FIGURE 3.

Still another embodiment of applicant's voltage control circuit is illustrated in FIGURE 3, which basically includes the circuit of FIGURE 2 but which has an extended range of control not limited to the inverse voltage of a single transistor. This is accomplished by the addition of two secondary winding portions 65–66 and 69–70, three switch operated transistor devices 76 to 78 and three pair of rectifying diodes 83–84, 85–86 and 89–90. In the illustrative embodiment of FIGURE 3, five different levels of output voltages may be obtained, illustrated in FIGURE 4, as compared to two levels in FIGURE 2. The circuit, if desired, may be further modified to accommodate any desired range of control by the suitable addition of diode pairs, transformer taps and regulator transistors.

As previously, an alternating voltage is applied to the input terminals 60 and 61 of primary winding 62 of transformer 63. Secondary winding 64, having terminals 65 to 70, is coupled through the rectifying circuits to the output terminals 71 and 72 by way of filter 73, the filter and output terminal connections to the load 74 being as shown in FIGURE 2. The rectifying circuits include transistors 75 to 78 and diode elements 79 through 90. Diode elements 79, 80, 89 and 90, which provide a full wave rectified output voltage of a first peak amplitude level, are connected to terminal taps 67 and 68, the cathode of diode 79 and the anode of diode 89 being connected to tap 67 and the cathode of diode 80 and the anode of diode 90 being connected to tap 68. The cathodes of diodes 89 and 90 are connected to filter circuit 73 and the anodes of diodes 79 and 80 are connected to ground. Diodes 81, 82, 87 and 88 and transistors 75 and 78 form shunting circuits around diodes 79, 80, 89 and 90, and add a second and third peak amplitude level of operation. The cathode of diode 81 and the anode of diode 87 are connected to terminal tap 66 and the cathode of diode 82 and the anode of diode 88 are connected to the terminal tap 69. The emitter electrode 91 of transistor 75 is connected to the grounded junction of the anodes of diodes 79 and 80, and the collector electrode 92 is connected to the junction of the anodes of diodes 81 and 82. The emitter electrode 93 of transistor 78 is connected to the junction of the cathodes of diodes 87 and 88, and the collector electrode 94 is connected to the junction of the cathodes of diodes 89 and 90. The transistors 75 and 78, preferably operated in a switching mode, are controlled respectively by sources of control signals 95 and 98, similar to those shown in FIGURES 1 and 2, that are connected respectively between the emitter and base electrodes of transistors 75 and 78.

Fourth and fifth peak amplitude levels of operation are provided by diodes 83 to 86, and transistors 76 and 77 which provide additional shunting circuits around diodes 81, 82, 87 and 88. The cathode of diode 83 and the anode of diode 85 are connected to the terminal 65 and the cathode of diode 84 and the anode of diode 86 are connected to the terminal 70. The emitter electrode 99 of transistor 76 is connected to the collector electrode 92 of transistor 75, and the collector electrode 100 is connected to the junction of the anodes of diodes 83 and 84. The emitter electrode 101 of transistor 77 is connected to the junction of the cathodes of diodes 85 and 86, and the collector electrode 102 is connected to the emitter electrode 93 of transistor 78. The transistors are controlled by the control signal sources 96 and 97 which are connected respectively between their emitter and base electrodes.

The operation of the circuit illustrated in FIGURE 3 is similar to that of the circuit in FIGURE 2. If it is assumed that each of transistors 75 to 78 is in the nonconductive condition, a full wave rectified voltage of a first peak amplitude level corresponding to the voltage induced in the winding between taps 67 and 68 will be applied to filter 73. This first rectified voltage is illustrated as curve 1 in FIGURE 4. With the primary and secondary windings of transformer 63 poled in the same direction as shown, during the positive half cycle of the alternating current input voltage applied to input terminal 60 of the primary winding, a voltage will be induced in the secondary winding such as to cause current to flow out of terminal tap 67 through diode 89, through filter circuit 73 to the load 74 and thence to ground. From ground the current will return through diode 80 and to terminal tap 68. Since all of the transistors are switched "off", the current cannot take any other path and diodes 81 to 88 are nonconductive. During the negative half cycle of the input voltage, the secondary current will flow out of terminal tap 68 through diode 90, through filter circuit 74, to the load, to ground and through diode 79 to terminal tap 67. Thus, only that portion of the induced voltage between taps 67 and 68 is coupled to the load.

With all of the transistors 75 to 78 in the conductive state, the path for the secondary current includes all of the transistors and diodes 83 to 86, and all of the voltage induced in the secondary winding is applied as a full wave rectified voltage to the filter circuit. This is another peak amplitude level of output voltage corresponding to curve 5 of FIGURE 4. In this condition, for a positive half cycle of alternating current input voltage applied to the input terminal 60, secondary current will flow out of terminal 65, through diode 85, through transistors 77 and 78, through the filter circuit, to the load, to ground, through transistors 75 and 76 and through diode 84 to the opposite terminal 70. During the negative half cycle of input voltage the secondary current will correspondingly flow in the reverse direction through diodes 86 and 83 in addition to transistors 75 to 78. By a brief inspection of the circuit, recalling that the conducting transistors offer negligible resistance, it will be apparent that for this condition diodes 79 to 82 and 87 to 90 are biased in the nonconductive state.

Three other output levels may be obtained by selectively making one, two or three of the transistors conductive, whereby the secondary current paths may be traced out in similar fashion as above. For example, with transistor 77 nonconductive, those portions of the secondary winding 64 between terminals 66 and 70 and between terminals 69 and 65, in which are normally induced substantially equal voltages, are coupled to the filter circuit 73 as a full wave rectified voltage corresponding to a third peak amplitude level, illustrated as curve 4 of FIGURE 4. With transistors 77 and 78 nonconductive, only that voltage between terminals 67 and 70 and between terminals 68 and 65 is coupled to filter circuit 73 indicative of a fourth peak amplitude level of output voltage, illustrated as curve 3 in FIGURE 4. With transistors 76 to 78 nonconductive the voltage between terminal taps 67 to 69 and between taps 68 and 66 is transmitted to the filter circuit and constitutes the fifth peak amplitude level, corresponding to curve 2 of FIGURE 4. It should be noted at this point that turning "off" transistor 78 also renders transistor 77 nonconductive. Likewise, turning "off" transistor 75 renders transistor 76 nonconductive. Therefore, care must be taken in determining the sequence of the switching operation.

In the non-linear or switching mode of operation, described above, the regulator may be controlled to turn "on" and "off" so that the output voltage of the rectifying circuit which is applied to the smoothing filter will switch between two distinct levels of voltage, where the two levels may be greatly more separated than was possible in the circuit of FIGURE 2, for example, between the voltage levels of curves 1 and 5. An example of such operation is where the transistors 75 to 78 are all turned "on" and "off" simultaneously. Or the transistors 75 to 78 may be controlled to sequentially turn "on" and "off" so that the output voltage of the rectifying circuit will successively switch through the five output levels in steps, from one level to the adjacent level, as is shown by the solid line in FIGURE 4.

An advantage of the circuit of FIGURE 3 over those of FIGURES 1 and 2 is that the range of control is greater. I have learned that the maximum inverse voltage experienced by the transistor is equivalent to the peak value of the tapped voltage across which it is connected, and that this tapped voltage determines the range of control. Since in FIGURE 3 the transistors are connected in tandem across the tapped portions of the secondary winding, the tapped voltage is shared by as many transistors as are connected and is therefore allowed to be greater. A further advantage when controlling the transistors to operate sequentially is that the ripple content of the voltage feeding the filter 73 is further reduced, allowing use of a smaller filter. Still another advantage is that more than one control source may be utilized to provide compensation for a number of independent factors. For example, in voltage regulator operation a control signal representative of the load condition may be applied to some of the transistors, and a control signal representative of the input line voltage may be applied to others of the transistors.

It should be understood that the embodiments illustrated in FIGURES 1, 2 and 3 are merely exemplary and various modifications may be made to the circuits without exceeding the scope of the invention. For example, the circuits under certain conditions, can operate as half wave rectifiers, eliminating half the number of diodes. It is obvious that other type transistors such as NPN can be incorporated into the circuits. In addition, other type semiconductor devices exhibiting good switch characteristics can be utilized, such as controlled rectifiers, double base diodes and tunnel diodes. Or thermionic devices may be employed where it is desirable to furnish a very high output voltage in excess of the inverse voltage capabilities of the thermionic device. In operation, the switching devices can be made to switch once, twice or as often as suitable, during each half cycle period or to switch every several cycles, as when using slower acting switches.

Figure 5:
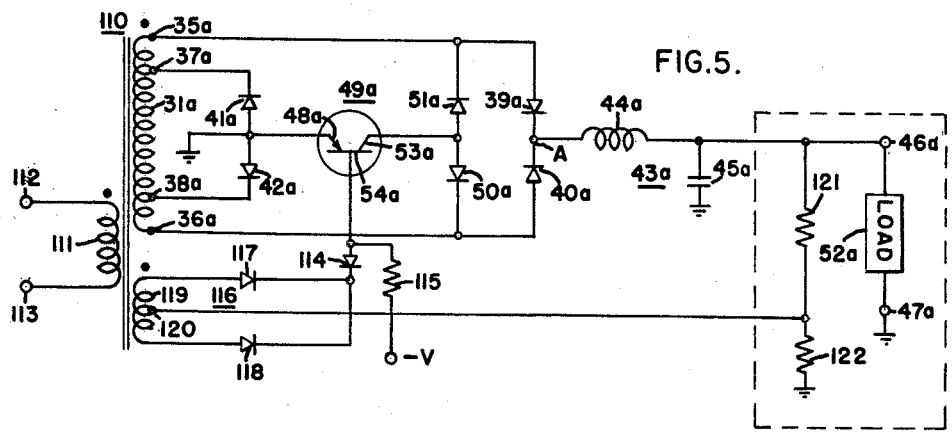
FIGURE 5 is a schematic diagram of a voltage regulator system in accordance with the invention featuring a simplified feedback circuit and employing the transformer tap circuit illustrated in FIGURE 2.

FIGURE 5 shows a voltage regulator system, for use as a power supply, wherein a constant direct voltage output is obtained from an unregulated alternating line input voltage. The illustrated system has a simplified feedback circuit which senses two conditions affecting the output voltage. An identical tapped transformer and rectifier switching circuit, as illustrated in FIGURE 2 is employed, and similar components are designated similarly but with the addition of a subscript "a." It should be understood however that the circuit of FIGURE 1 can alternatively be used to obtain identical results. There is employed transformer 110 comprising primary winding 111 with input terminals 112 and 113, secondary winding 31a having terminals 35a to 38a, which terminals are connected as in FIGURE 2 to diodes 39a, 40a, 41a 42a, 50a and 51a and to transistor 49a. A filter circuit 43a, as in FIGURE 2, connects the rectifying circuit to the load 52a.

The feedback circuit provided controls the operation of the transistor 49a by applying a control voltage to the base 54a thereof. The feedback circuit comprises a comparator circuit that includes a Zener breakdown diode 114, which provides a first comparator or control voltage equivalent to the breakdown voltage. The anode of diode 114 is connected to base 54a, and through resistor 115 to a source of negative potential $-V$ which provides base current for transistor 49a and maintains the transistor conductive for so long as the diode 114 is nonconductive. The base voltage is shown by curve 1 in FIGURE 7. The voltage source $-V$ may be replaced by a pulsating negative voltage conveniently obtained from a rectifying circuit coupled to a secondary winding of transformer 110. The cathode of diode 114 is connected to a full wave rectifier circuit 116 including diodes 117, 118 and secondary winding 119 which provides a second comparator voltage. Diodes 117 and 118 are connected at their cathodes to the cathode of diode 114 and at their anodes to opposite ends of winding 119. Winding 119 is provided with a center tap 120 which is connected to the junction of resistors 121 and 122. Thus, the second comparator or control voltage applied to the cathode of diode 114 is a positive voltage which is the sum of the uniform direct voltage derived from resistors 121 and 122, proportional to the load voltage, and a pulsating positive direct voltage which is proportional to the input voltage derived from the rectifier circuit. This summation voltage may take the waveform of curve 2 of FIGURE 7.

In the operation of the circuit of FIGURE 5, the transistor is controlled to perform in the low loss switching mode to provide either of two peak amplitude levels of rectified output voltage to the filter circuit, as in FIGURE 2. With the transistor 49a conducting, or the switch closed, substantially the voltage of the entire winding between terminals 35a and 36a is supplied to the load. The voltage appearing at the rectifier output, point A, follows the waveform of curve 1 in FIGURE 6. With the transistor in the nonconductive condition, switch open, a portion of the voltage of winding 31a, between terminals 35a and 38a or 36a and 37a, is supplied to the load, and the voltage at the rectifier output follows the waveform of curve 2 in FIGURE 6. The switching action of the transistor yields the notched waveform shown by the solid line in FIGURE 6.

Transistor 49a, illustratively shown to be of the PNP type, is conductive when a negative potential is applied to its base 54a and nonconductive with a positive potential applied thereto. As previously stated, negative direct voltage $-V$ maintains the transistor conductive for so long as the breakdown diode 114 is nonconductive. When diode 114 conducts, the positive pulsating direct voltage that is applied to the cathode of diode 114, less the voltage drop across the diode, now appears at the base 54a and biases transistor 49a nonconductive. The breakdown voltage of diode 114, between points $a$ and $b$, determines at what point the diode will conduct, and thus controls the switching action of the transistor.

Figure 7:
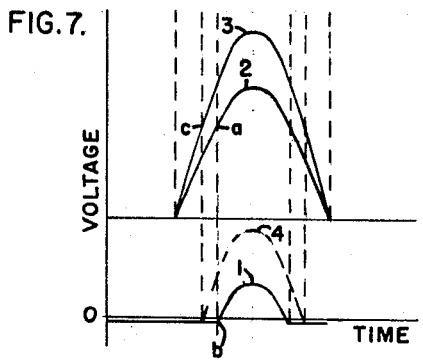
FIGURE 7 is a graph illustrating the voltage waveforms appearing at the cathode and anode electrodes of the comparator diode of FIGURE 5.

The switching control is effected in the following manner. Referring to FIGURE 7, the voltage at the anode of the diode 114 before breakdown, is slightly negative, shown by curve 1, since the base to emitter voltage drop of transistor 49a is small. The positive voltage at the cathode of diode 114, shown by curve 2, is low during low amplitude portions of the alternating current input voltage. At this time the negative voltage of curve 1 is applied to the base of the transistor 49a, maintaining it in the conductive state. As indicated by curves 1 and 2, as the input alternating voltage increases in magnitude, the cathode of diode 114 becomes increasingly positive At some point, determined by the breakdown voltage of diode 114, point a, the diode will become conductive and the positive voltage derived from rectifier circuit 116, less the voltage drop across diode 114, will be applied to the base 54a thereby making transistor 49a nonconductive, or opening the switch, in which condition it will remain until the voltage across the diode 114 again falls below the breakdown voltage. The time at which the breakdown of diode 114 occurs is determined by the variation of both the alternating current input voltage and the direct current load voltage. For example, should the unregulated alternating current input voltage increase, providing a cathode voltage as shown by curve 3 of FIGURE 7, the point of breakdown of diode 114 would occur sooner, at point c, and the transistor would be in the nonconductive condition for a greater portion of each half cycle. The base voltage would be as in curve 4. The notch in the waveform of FIGURE 6 would thus be widened. Similarly, should be unregulated alternating current input voltage decrease, the transistor would be conductive for a smaller portion of each cycle. Variations in the direct current load have a similar effect on the transistor operation. It is therefore seen that a pulsed control signal is applied to the base of the transistor having a duty cycle that is a function of the relative magnitudes of the pulsating voltage applied to diode 114 and of the diode breakdown voltage. The duty cycle of the control signal corresponds to the duty cycle of the transistor and automatically adjusts so that the direct current output voltage is maintained constant.

Figure 5A:
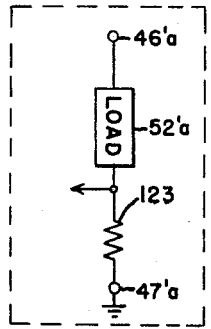
FIGURE 5A illustrates a modification of the feedback circuit of FIGURE 5 providing a constant current output.

The circuit of FIGURE 5 may be made to operate as a constant current source by adding a relatively small current sensing resistor 123 in series with the load and ground terminal 47a, as shown in FIGURE 5A. The center tap 120 of rectifier circuit 116 is then connected to the high voltage side of resistor 123 in lieu of the connection to the junction of resistors 121 and 122. The voltage may thus be controlled to provide a predetermined constant current output. An advantage of this circuit over conventional switching circuits employing switching devices of restricted inverse voltages is that a higher output voltage can be attained, thereby accommodating a greater load impedance than was possible previously for a given constant current output.

A further embodiment of applicant's voltage regulator system is illustrated in FIGURE 8 wherein there is shown a circuit employing both a low loss switching regulator and a linear series regulator. The switching regulator circuit performs the course regulation and the final, high speed, high accuracy regulation is performed by the linear series regulator. The switching regulator includes a tapped transformer and a rectifier switching circuit similar to the voltage control circuit of FIGURE 2, with the addition of a few refinements to be described. Similar components are given similar designations but with the addition of a subscript "b." The feedback circuit employs a comparator transistor 130, in lieu of the breakdown diode 114 of FIGURE 5, to control the operation of switching transistors 49b and 131. The supply is arranged so that the major portion of the regulation is performed by the high efficiency switching regulator and the final degree of regulation is performed by a fast action series regulator. The error signal which operates the switching transistors 49b and 131 is derived from the voltage drop across the series regulator. The switching regulator in effect monitors the voltage drop across the series regulator and maintains the drop at an acceptable level.

An alternating current input line voltage is applied to the primary winding 132 of transformer 133 and to primary winding 134 of transformer 135. The switching regulator circuit includes secondary winding 31b, diodes 41b, 42b, 51b, 50b, 39b and 40b, and transistor 49b, connected as in FIGURE 2 to feed a rectified voltage to filter circuit 43b, and in addition incorporates a switching transistor 131 connected in series with the transistor 49b for the purpose of sharing the inverse voltage of windings 35b–37b and 36b–38b, thus allowing this voltage to be increased and extending the control range. Two transient voltage protection networks are connected in parallel with transistors 49b and 131 to prevent switching transient voltage spikes from damaging the transistors. The collector 53b of transistor 49b is joined to the emitter 136 of transistor 131, and collector 137 is connected to the anodes of diodes 51b and 50b. The first transient voltage protection network comprising resistor 138, capacitor 139 and diode 140 is connected in parallel with transistor 49b, resistor 138 and capacitor 139 each joined at one terminal to the anodes of diodes 41b and 42b and joined at their other terminals to the anode of diode 140, the cathode of which is connected to the junction of collector 53b and emitter 136. The second protection network comprising resistor 141, capacitor 142 and diode 143 is similarly connected in parallel with transistor 131.

The switching action of transistors 49b and 131 is controlled by the feedback circuit, including comparator transistor 130, which provides pulsed control signals to the base electrodes 54b and 144 of the switching transistors of positive or negative value so as to turn said transistors "on" and "off." A first rectifier circuit 145 comprising secondary winding 146 of transformer 133, diodes 147, 148 and capacitor 149 provides a negative rectified smoothed current to base electrodes 54b and 144 of transistors 49b and 131 and to the collector electrode 150 of transistor 130. Diodes 147 and 148 have their cathodes respectively connected to opposite ends of winding 146. Capacitor 149 is connected between the junction of the anodes of these two diodes and a center tap connected to negative bus bar 151. The junction of the anodes is connected through resistors 152 and 153 to base electrodes 54b and 144 and to collector 150. A second rectifier circuit 154 comprising a center tapped secondary winding 155 of transformer 135 and diodes 156 and 157 provides a positive rectified pulsating voltage, which is a first comparator or control voltage, to the emitter 158 of transistor 130. This voltage may be shown by the waveform of curve 1 of FIGURE 9. The anodes of diodes 156 and 157 are respectively connected to the opposite ends of winding 155 and the cathodes thereof are joined at a common junction to the emitter electrode 158. This pulsating direct voltage is proportional to the alternating current input line voltage and is compared to the direct voltage developed across capacitor 160, which is related to the load voltage and is a second comparator or control voltage. The capacitor voltage may be shown by the waveform of curve 2 of FIGURE 9. The relative magnitude of these voltages determines the point at which the transistor conducts, illustrated at point "a" in FIGURE 9. When transistor 130 becomes conductive a positive voltage from the emitter 158 appears at the base electrode of regulator transistor 49b, turning it "off." This causes transistor 131 to also turn "off."

The voltage applied to the base 159 of transistor 130 is a function of the load voltage, being inversely related thereto. It is developed across capacitor 160 which is connected from the collector 161 of amplifier transistor 162 to ground. Diode 163 and resistor 164 are in parallel with capacitor 160, the junction of the cathode of diode 163 and resistor 164 being tied to base 159 of transistor 130. Diode 163 is poled to prevent the highly positive voltages of base 159 from charging capacitor 160 when the transistor is conducting. The value of the direct voltage across capacitor 160 is varied by a circuit including amplifier transistor 162, illustratively shown of the NPN type, which is made to operate as a variable impedance. Its collector 161 is connected by resistor 165 to a source of positive potential, which is conveniently the output terminal 166 but which may be an external source of supply. The emitter electrode 167 is connected to ground through resistor 168.

The input voltage for amplifier transistor 162 is provided by an emitter follower linear series regulator. The voltage across said linear regulator is compared to a reference voltage of non-linear attenuation network 170 to supply a direct voltage error signal to the base 169 for final, high accuracy regulation. The emitter follower linear series regulator is composed of compound connected transistors 171 and 172, diodes 173 and 174, capacitor 175 and a reference supply 176. The reference supply 176 provides a stable voltage equal to the rated or desired power supply output voltage, and may take the form of a base controlled converter such as disclosed in applicant's co-pending application, Serial No. 803,598, filed April 2, 1959. The reference supply is connected from the positive converter output terminal 166 through resistor 177 to the input base electrode 178 of the compound transistor stage. Resistor 177 is inserted merely to protect the reference supply from high transient current. However, during normal operation very little current flows in its circuit and the voltage across the resistor is negligible. The emitter electrode 179 of transistor 172 is connected to the negative output terminal 180. The base electrode of transistor 172 is joined to emitter electrode of transistor 171. The collectors 181 and 182 are commonly connected to the negative bus 151. Since the base to emitter voltage drops are extremely small, a consequence of the emitter follower connection is that the voltage at the emitter terminal 179 is very nearly equal to input voltage at the base 178, which in this case is the reference voltage. Capacitors 183 and 175, connected across the reference supply, function to eliminate any ripple in the input and output voltage of the reference supply. The diodes 173 and 174 are connected respectively from the input base electrode 178 of the emitter follower stage to the negative bus 151 and to a positive 15 volt voltage source, the cathode of diode 173 and the anode of diode 174 being joined to the base 178. The diodes are polarized so that conduction takes place whenever the base input voltage exceeds either 15 volts positive or the negative voltage of bus 151. This prevents excessive voltages which occur during the charge and discharge of capacitor 175 from damaging transistor 171.

The regulation of the overall power supply is very nearly equal to the regulation characteristics of the reference supply. Thus, the reference supply should exhibit a high degree of regulation with respect to line and temperature variations if the overall supply is to have similar characteristics. The load regulation is further dependent upon the emitter follower properties of the transistors 171 and 172. For good load regulation capability, the emitter follower should have high current gain and low emitter base voltage drop. The compound connection of transistors 171 and 172 aids in achieving the necessary current gain. However, the compound transistor configuration of the emitter follower stage may be replaced by a single transistor having a very high current gain characteristic or by any suitable linear regulator.

The voltage drop across the emitter follower stage is equal to the difference between the filtered output voltage of the transformer tap regulator circuit, which appears across capacitor 45b, and the output terminal voltage. This difference voltage is maintained at a sufficiently low value by the switching regulator as to be well within the tolerable operating range of the emitter follower stage.

This voltage is applied from the emitter 179 to the amplifier transistor 162 through the non-linear diode attenuation network 170 which has an attenuation characteristic opposed to the non-linear gain characteristic of the comparator and switching regulator sections. The gain of the comparator and switching regulator sections is greater for the low error voltages than for the high error voltages. Thus, the gain of the amplifier stage with the diode attenuator input network is variable and is low for low values of voltage across the emitter follower stage and is high when the emitter follower voltage is high. The diode attenuation circuit 170 is illustratively shown to comprise diodes 184 to 189 and resistors 190 to 193, the diodes being connected in series and poled in the same direction with the anode of diode 184 connected to the emitter 179 and the cathode of diode 189 connected to the base 169 of transistor 162 through resistor 194. The attenuation circuit can be made to comprise more or fewer diode stages, as required. The lower terminals of resistors 190 to 193 are connected in common to one terminal of resistor 194 and to the upper terminals of the parallel combination of resistor 195 and capacitor 196, the lower terminals of which are joined to the negative bus 151. The other terminal of resistor 194 connects to the base 169. The upper terminal of resistor 190 is connected to the junction of the cathode of diode 185 and the anode of diode 186. The upper terminal of resistor 191 is connected to the cathode of the diode 186 and to the anode of diode 187. The resistor 192 is connected to the cathode of the diode 187 and to the anode of diode 188. The resistor 193 is connected to the junction of the cathode of diode 188 and the anode of diode 189.

In the operation of the circuit of FIGURE 8, the switching regulator circuit will fuction in the manner described with relation to the preceding figures to couple the entire voltage or only a portion of the voltage induced in winding 31b to the output. The control of transistors 49b and 131, which operate simultaneously, is determined by the conductive condition of comparator transistor 130. The first rectifying circuit 145 produces a negative direct voltage across capacitor 149 which supplies base current to the transistors 49b and 131 to maintain them in the conductive or "on" condition as long as transistor 130 is nonconducting. Transistor 130, being of the PNP type, will be nonconductive when the positive direct voltage applied to its base 159 is of greater magnitude than the positive pulsating voltage applied to its emitter 158 from the second rectifying circuit 154. Conversely transistor 130 will conduct when this voltage relationship is reversed. For low amplitude voltages applied to emitter 158, the transistor will not conduct, allowing the negative current supplied by the first rectifying circuit 145 to maintain the transistors 49b and 131 in the "on" condition. As the voltage applied to the emitter 158 increases, or becomes more positive, a point is reached, "a" as shown in FIGURE 9, at which the base 159 voltage is exceeded and transistor 130 conducts. The voltage at the collector 150 becomes positive and the switching transistors turn "off" and remain "off" until the emitter 158 voltage again falls below the base 159 voltage, at which time the switching transistors again turn "on." It is therefore seen that a pulsed control signal is applied by the comparator transistor to the switching transistors having a duty cycle that is a function of the relative magnitudes of the emitter and base voltages of said comparator transistor, the duty cycle of the control signal corresponding to the duty cycle of the switching transistors. Thus, should the peak amplitude of the emitter voltage increase, the comparator transistor would conduct sooner and for a longer interval and the duty cycle of the control signal would change. The switching transistors accordingly would be nonconductive for a longer interval. Similarly for a change in load voltage, the base voltage of the comparator transistor changes accordingly, which adjusts the duty cycle of switching transistors to compensate for said load voltage change. It is therefore seen that a pulsed control signal is applied to the switching transistors having a duty cycle that is a function of the relative magnitudes of the emitter and base voltages of the comparator transistor.

The direct current control voltage for base 159 is derived from the emitter follower stage which provides an error voltage through amplifier transistor 162, said error voltage being the difference between the voltage across the emitter follower stage, between emitter 179 and collector 182, and the reference voltage of the attenuation network 170. The voltage which appears across the emitter follower stage is maintained at a predetermined value, approximately five volts, by the switching regulator. Thus the switching regulator output voltage across capacitor 45b is at a level somewhat above the rated or desired output voltage of the power supply system. Any tendency for the voltage across the emitter follower to vary either above or below the predetermined value is corrected by an amplifier error voltage which is connected to the comparator transistor. For example, with a desired output voltage of 250 volts, the voltage across the emitter follower stage is maintained at 5 volts, placing 255 volts across capacitor 45b. The output voltage will be maintained at 250 volts providing the reference supply is at this voltage although the capacitor 45b voltage may tend to vary. If the input alternating current line voltage should increase, which would tend to increase this latter voltage initially, all of the increased voltage would be registered across the emitter follower stage by a decreased conduction therein, and the output voltage at terminals 166 and 180 would be unaffected because it remains fixed to essentially the value of the reference supply voltage. The increased voltage across the emitter follower stage is compared to the reference voltage of attenuation network 170 and produces an increased voltage at the base of transistor 162 which increases the conduction thereof and lowers the potential applied to the base of transistor 130. This will cause transistors 49b and 131 to conduct during a lesser portion of each cycle, thus reducing the output of the switching regulator section and restoring the voltage across emitter follower stage to the prescribed 5 volt level.

The outstanding advantage accruing to the system of FIGURE 10 is that there is afforded the high efficiency, high power regulating characteristics associated with a tap regulator in addition to the high speed, high accuracy properties of the series regulator.

The circuit may be modified to protect against load overload which would burn out the series regulator transistors 171 and 172 by, for example, adding additional transistors which would momentarily absorb the output voltage until a fast action fuse or circuit breaker was actuated. Other possibilities include the use of a large output capacitor and fuse arrangement or a power Zener diode arrangement in the series regulator circuit. In addition, if it is desired to reduce the power loss in the base resistor 152, it may be replaced by a further transistorized switching circuit which alternately couples the collector potential of the comparator transistor and the source of negative potential to the base electrode of the switching transistor 49b.

The circuit may be simplified and operated solely as a high efficiency regulator, if desired, by eliminating the emitter follower linear series regulator and providing the amplifier transistor 162 with an input from a tapped potentiometer connected across the load, the voltage from the potentiometer being compared to a Zener diode reference and the difference connected to the base 169 of amplifier transistor 162. In addition, the circuit may be operated as a low frequency amplifier by eliminating the emitter follower linear series regulator and coupling the input signal to be amplified to the base of transistor 162. The operation of the circuit is otherwise the same as before.

In one particular operative embodiment of the voltage regulator converter system of FIGURE 8 where it is desired to obtain a regulated 250 volt, 3 ampere direct current output from an unregulated 155 volt alternating voltage input, the following components may be employed. The values given are for purposes of illustration only and are not to be construed as limiting:

| | |
|---|---|
| Switching transistors 49b and 131 | type 2N418. |
| Comparator transistors 130 | type H7 Minneapolis Honeywell. |
| Amplifier transistor 162 | type 2N357. |
| Power transformer 133 | 115 v.–350 v. tapped 75 v. from each end, 100 v. center tapped. |
| Power transformer 135 | Stancor 24 v. center tapped filament. |
| Linear regulator transistor 171 | type 2N188. |
| Linear regulator transistor 172 | type 2N174. |
| Resistors 152, 153 | 700 ohms. |
| Resistors 138, 141, 193 | 2K ohms. |
| Resistors 164, 177, 194 | 1K ohm. |
| Resistor 165 | 14.2K ohms. |
| Resistor 168 | 68 ohms. |
| Resistor 190 | 16K ohms. |
| Resistor 191 | 8K ohms. |
| Resistor 192 | 4K ohms. |
| Resistor 195 | 390 ohms. |
| Input voltage | 115 volts A.-C. |
| Reference supply 176 | 250 volts. |
| Power output | 250 volts, 3 amps. |
| Bus Bar 151 | −5 volts. |
| Diodes 41b, 42b, 50b, 51b | type IN1128. |
| Diodes 140, 143, 147, 148, 174 | type IN645. |
| Diodes 156, 157, 163, 173 | type IN91. |
| Diodes 184, 185, 186, 187, 188, 189 | L.V. silicon diodes (HD6161). |
| Capacitors 139, 142, 149, 160 | 50 µf. |
| Capacitor 45b | 900 µf. |
| Capacitor 175 | 40 µfd. |
| Capacitor 183 | 1000 µf. |
| Capacitor 196 | 3 v. Hi Capacity. 1.0 Ω @ 60~. |
| Inductor 43b | Swinging Choke 1 henry @ .5 amps. to .25 h. @ 3 amps. |

A further embodiment of applicant's voltage regulator system is illustrated in FIGURE 10. This system employs a switching regulator, having a range extended to 3 levels of output voltage. The comparator circuits, which include the comparator transistors and their local circuitry, generally take the form of the circuit illustrated in FIGURE 8 but a modified control circuit is necessitated since the switching transistors 49c and 200 operate at different voltage levels and require direct current isolation. Again, similar components in the tapped transformer-rectifier switching circuit to those found in the system of FIGURE 2 will be given similar designations.

As in FIGURE 8 the alternating current input line voltage is applied to primary windings 201 and 202 of transformers 203 and 204 and a uniform direct voltage is obtained at output terminals 205 and 206. The transformer tap circuit is connected as in FIGURE 2, but for the addition of transistor 200, diodes 207 and 208 and a first and second protection network 209 and 210. The junction of the cathodes of diodes 39c and 40c is connected through the emitter-collector circuit of transistor 200 to the junction of the cathodes of diodes 207 and 208. In parallel with the transistors 49c and 200 are connected the protection networks. The anode of diode 207 is connected to terminal tap 37c, the anode of diode 208 is connected to terminal tap 38c and the junction of their cathodes is connected to filter circuit 43c.

The comparator circuits, although similar to the comparator circuit shown in FIGURE 8, operate at different voltage levels. The comparator circuit controlling transistor 49c is referenced at ground and the second comparator circuit is referenced at a considerably higher potential since transistor 200 operates at the high voltage end of the rectifier circuit. They are also more compact in that the first and second rectifier circuits of FIGURE 8 are combined into single rectifier circuits 211 and 212. Diodes 213 and 214 connect a negative direct voltage through resistor 215 to base 54c and collector 216 of comparator transistor 217. Diodes 218 and 219 connect a second negative direct voltage through resistor 220 to base 221 of transistor 200 and collector 222 of comparator transistor 223. Diodes 224, 225 and 226, 227 connect a pulsating positive direct voltage to emitter electrodes 228 and 229, respectively. The comparator transistor 217 is connected at its collector electrode 216 to the base electrode 54c of switching transistor 49c. The comparator transistor 223 is connected at its collector electrode 222 to the base electrode 221 of switching transistor 200.

The control voltages for the comparator transistors across capacitors 230 and 231 are obtained from a base-controlled converter 232 acting as a transformer coupled direct current amplifier. The circuit 232 may take the form of the base-controlled converter disclosed in applicant's co-pending application, Serial No. 803,598, filed April 2, 1959. Full wave rectifier circuits 233 and 234 connect the output of base-controlled converter 232 respectively to the capacitors 230 and 231. The input of the base-controlled converter is taken from the output of the potentiometer 235 which with series resistor 236 is connected across regulator output terminals 205 and 206. A tapped position on the potentiometer is connected through reference breakdown diode circuit 237, to the base 238 of amplifier transistor 239. The output of amplifier 239 is connected at its collector electrode 240 to the input base electrode 241 of amplifier transistor 242, the output of which is connected to the base-controlled converter 232. The converter 232 comprises transistors 243 and 244 connected through diodes 245 and 246 to the primary tapped winding 247. In response to a direct current input signal, connected through diodes 248 and 249, the transistors alternately conduct and provide a square wave output, the amplitude of which is proportional to the input. The rectifier circuits at the output of the base-controlled converter are each center tapped and connected to direct current buses of different potential. The base-controlled converter therefore provides at its output an amplified direct voltage which can be utilized to feed a plurality of circuits which are isolated direct current wise from each other. It is noted that the feedback circuit can alternatively be connected to the input of filter circuit 43c, to obviate regulator instabilities which might arise due to the output filter circuit. This would require an R-C filter connected in series with the potentiometer.

In the operation of the circuit of FIGURE 10, the transformer tap regulator tap circuit will function similarly to the circuit described with reference to FIGURE 3, switching transistors 49c and 200 operating simultaneously or successively to vary the peak amplitude level of the rectified voltage coupled to filter network 43c. The voltage difference between the peak amplitude levels now appears across two transistors and may be made equal to the sum of the inverse voltages appearing across both of the transistors. The comparator circuits operate similarly to the comparator circuit of FIGURE 8. A positive pulsating direct voltage which is proportional to the alternating input voltage is applied to each of the emitters of transistors 217 and 223. To each of the base electrodes is applied a direct voltage, being related to the load voltage but respectively of differing values relative to the ground bus. This provides direct current isolation of the two switching transistors.

A transformer tap regulator circuit having a still greater range of operation, such as illustrated in FIGURE 3, may be utilized in the circuit of FIGURE 10 by employing additional comparator circuits having additional voltage operating levels relative to the ground bus.

The regulator circuit of FIGURE 10 may operate as a constant current source by connecting the reference diode circuit 237 to a current sensing resistor connected in series with the load, in lieu of the connection to potentiometer 235, similar to the showing in FIGURE 5A. The circuit may also perform as a low frequency amplifier by deleting the feedback connection coupling and coupling only the input signal to the base of amplifier 239.

While particular embodiments of the invention have been shown and described to illustrate the principles of the invention, many variations and modifications thereto will be immediately obvious to those skilled in the art without departing from these principles. The appended claims are therefore to be construed as covering any such modifications and variations which do not exceed the true scope and spirit of the invention.

What I claim as new and desire to secure by Letters Patent of the United States is:

1. A voltage control circuit for energization by a source of alternating voltage comprising a transformer having an input winding and an output winding, said source of alternating voltage being connected to said input winding, a load, a first rectifying circuit including a first rectifier element connected between a first portion of said output winding and said load, the voltage induced in said first portion being of a first peak amplitude level and of a given polarity, at least a second rectifying circuit including a second rectifier element and a controllable conductive means connected between a second portion of said output winding and said load, the voltage induced in said second portion being of a second peak amplitude level and of said given polarity, so that the maximum inverse voltage applied across said controllable means is no greater than the difference between said peak amplitude levels, and means for controlling the conductivity of said controllable means to vary the magnitude of the rectified voltage connected to said load, thereby varying the output voltage.

2. A voltage control circuit for energization by a source of alternating voltage comprising a transformer having an input winding and an output winding, said source of alternating voltage being connected to said input winding, a load, a first rectifier means connected in a first circuit with said load and a first portion of said output winding for rectifying the voltage induced in said first portion, a second rectifier means and a controllable conductive means connected in a second circuit with said load and a second portion of said output winding for rectifying the voltage induced in said second portion, the voltages induced in said first and second portions being of the same polarity, and means for controlling the conductivity of said controllable means to vary the magnitude of the rectified voltage connected to said load, thereby varying the output voltage.

3. A voltage control circuit for energization by a source of alternating voltage comprising a transformer having an input winding and an output winding, said source of alternating voltage being connected to said input winding, a load, a first rectifying circuit including a first rectifier element connected between a first portion of said output winding and said load, a second rectifying circuit including a second rectifier element and a controllable conductive means connected between a second portion of said output winding and said load, said first and second portions having voltages induced therein of the same polarity, and means for controlling the conductivity of said controllable means to vary the magnitude of the rectified voltage connected to said load, thereby varying the output voltage.

4. A voltage control circuit as in claim 3 wherein said controllable means is a semiconductor switching device and wherein said means for controlling the conductivity of said switching device comprises a comparator circuit including a breakdown diode which compares a first control voltage that is connected to an electrode of said diode with a second control voltage that is the breakdown voltage of said diode, said first and second control voltages causing said diode to intermittently conduct so as to provide to said semiconductor device a pulsed control signal whose duty cycle is a function of the relative magnitudes of said control voltages, said control signal actuating said semiconductor device to successively switch the voltages induced in said first and second output winding portions in circuit with said load.

5. A voltage control circuit as in claim 4 wherein said first control voltage is coupled from a load voltage sensing resistance connected in parallel with said load.

6. A voltage control circuit as in claim 4 wherein said control voltage is coupled from a load current sensing resistance connected in series with said load.

7. A low frequency amplifier circuit of high efficiency comprising a transformer having an input winding and an output winding, a source of alternating voltage of given frequency connected to said input winding, a load, a first rectifying circuit coupled between a first portion of said output winding and said load, said first portion having induced therein a voltage of a first peak amplitude level, a second rectifying circuit including a uni-directional switching means of a restricted inverse voltage capability and having a control electrode, said second rectifying circuit coupled between a second portion of said output winding and said load, said second portion having induced therein a voltage of a second peak amplitude level, so that the maximum inverse voltage applied across said switching means is no greater than the difference between said peak amplitude levels, an input signal of a frequency less than said given frequency, means for deriving a pulsed control signal from said input signal, said control signal having a duty cycle that is a function of the magnitude of said input signal, and being coupled to the control electrode of said switching means to control the switching action thereof, whereby said first and second peak amplitude level voltages are alternately coupled to said load to provide an output voltage whose amplitude is controlled by said input signal.

8. A low frequency amplifier circuit as in claim 7 wherein a filter circuit is coupled between said first and second rectifying circuits and said load, said filter having a time constant sufficient to pass only said input frequency and reject said given frequency.

9. A voltage control circuit for providing a predetermined direct current to a load from a source of alternating voltage comprising a transformer having an input winding and an output winding, said source of alternating voltage being connected to said input winding, a first rectifying circuit including a first rectifier element connected between a first portion of said output winding and said load, said first portion having induced therein a voltage of a first peak amplitude level and of a given polarity, a second rectifying circuit including a second rectifier element and a uni-directional control means connected between a second portion of said output winding and said load, said second portion having induced therein a voltage of a second peak amplitude level and of said given polarity, and means for controlling the conductivity of said uni-directional means so as to vary the magnitude of the rectified voltage connected to said load to provide an output voltage that supplies said predetermined load current.

10. A voltage control circuit for providing a direct voltage of a predetermined value to a load from a source of alternating voltage comprising a transformer having an input winding and an output winding, said source of alternating voltage being connected to said input winding, a first rectifying circuit including a first rectifier element connected between a first portion of said output winding and said load, said first portion having induced therein a voltage of a first peak amplitude level and of a given polarity, a second rectifying circuit including a second rectifier element and a controllable uni-directional conducting means having a predetermined inverse voltage capability, said second rectifying circuit connected between a second portion of said output winding and said load, said second portion having induced therein a voltage of a second peak amplitude level and of said given polarity, so that the maximum inverse voltage applied across said uni-directional conducting means is no greater than the difference between said first and second peak amplitude levels, and means for controlling the conductivity of said uni-directional conducting means so as to vary the magnitude of the rectified voltage connected to said load, thereby providing an output voltage of said predetermined value.

11. A voltage control circuit for energization by a source of alternating voltage comprising a transformer having a primary winding and a first and second secondary winding, said source of alternating voltage being connected to said primary winding, said secondary windings each comprising a tapped terminal, a load, a first full wave rectifying circuit coupled to a tapped portion of each of said first and second secondary windings for providing a rectified voltage of a first peak amplitude level to said load, a second full wave rectifying circuit including a semiconductor control device of a predetermined inverse voltage capability coupled to the entire first and second secondary windings for providing a rectified voltage of a second peak amplitude level to said load, so that the maximum inverse voltage applied across said control device is no greater than the difference between said first and second peak amplitude voltages, and means for controlling the conductivity of said semiconductor device to alternately switch said first and second full wave rectifying circuits in circuit with said load, the switching action occurring at least twice during each half cycle period of alternating voltage to provide an output voltage which is the time averaged value of said rectified voltage.

12. A voltage control circuit for providing an output voltage to a first and second output terminal from a source of alternating voltage comprising a transformer having an input and an output winding, said source of alternating voltage being coupled to said input winding, said output winding being composed of a first and second secondary winding, said secondary windings each having two end terminals and a tap terminal which divide them each into two sections, a filter circuit having an input and an output terminal, the output terminal of said filter circuit being joined to said first output terminal, one end terminal of each of said secondary windings being coupled in common to the input terminal of said filter circuit, a first full wave rectification circuit including a first pair of diodes for providing full wave rectification of a portion of the voltage induced in said secondary windings of one peak amplitude level, one diode of said first pair being coupled between the tap terminal of said first secondary winding and said second output terminal, the other diode of said first pair being coupled between the tap terminal of said second secondary winding and said second output terminal, a second full wave rectification circuit including a second pair of diodes and a semiconductor control device of a predetermined inverse voltage capability for providing full wave rectification of the entire voltage induced in said secondary windings of another peak amplitude level, said semiconductor control device coupling one diode of said second pair between the other end terminal of said first secondary winding and said second output terminal and coupling the other diode of said second pair between the other end terminal of said second secondary winding and said second output terminal, so that the maximum inverse voltage applied across said control device is no greater than the difference between said peak amplitude levels, and means for controlling the conductivity of said semiconductor control means so as to vary the magnitude of the rectified voltage coupled to said first and second output terminal, thereby varying the output voltage.

13. A voltage control circuit for energization by a source of alternating voltage comprising a transformer having a primary winding and a secondary winding, said source of alternating voltage being connected to said primary winding, said secondary winding having two end terminals and at least to two tap terminals which divide it into a plurality of sections, a load, a first full wave bridge rectifying circuit coupled to said secondary winding for providing to said load a rectified voltage of a first peak amplitude level corresponding to the peak voltage across a section of said secondary winding, said first bridge rectifying circuit including first and second pairs of diodes, one diode of said first pair being coupled between a first end terminal and one side of said load, the other diode of said first pair being coupled between a first tapped terminal and the other side of said load, one diode of said second pair being coupled between a second end terminal and said one side of said load and the other diode of said second pair being coupled between a second tapped terminal and said other side of said load, a second full wave bridge rectifying circuit including a part of said first bridge rectifying circuit coupled to the entire secondary winding for providing to said load a rectified voltage of a second peak amplitude level, said second bridge rectifying circuit including said one diode of said first pair and said one diode of said second pair for coupling the end terminals to said one side of said load, and a further pair of diodes coupled between said end terminals and said other side of said load a semiconductor control device connected in said second full wave bridge rectifying circuit, so that the maximum inverse voltage applied across said semiconductor device is no greater than the difference between said first and second peak amplitude voltages, and means for controlling the conductivity of said semiconductor device to alternately switch said first and second full wave bridge rectifying circuits in circuit with said load, the switching action occurring at least twice during each half cycle period of said alternating voltage, to provide an output voltage which is the time averaged value of said rectified voltage.

14. A voltage control circuit for providing an output voltage to a first and second output terminal from a source of alternating voltage comprising a transformer having a primary and a secondary winding, said alternating voltage being coupled to said primary winding, said secondary winding having a plurality of terminals which divide it into a plurality of sections, a filter circuit having an input and an output terminal, the output terminal of said filter circuit being joined to said first output terminal, a first full wave rectifying circuit including a first and a second pair of diodes for providing full wave rectification of a portion of the voltage induced in said secondary winding of one peak amplitude level, one of said first pair of diodes being coupled between a first winding terminal and the input terminal of said filter circuit, the other diode of said first pair being coupled between a second winding terminal and said second output terminal, one diode of said second pair being coupled between a third winding terminal and said filter input terminal and the other diode of said second pair being coupled between a fourth terminal and said second output terminal, a second full wave rectifying circuit for providing full wave rectification of another portion of the voltage induced in said secondary winding of another peak amplitude level, including said one diode of each of said first and second pair, a fifth and sixth diode and a semiconductor control device of a predetermined inverse voltage capability, said semiconductor device coupling said fifth diode between said third winding terminal and said second output terminal and coupling said sixth diode between said first winding terminal and said second output terminal, so that the maximum inverse voltage applied across said semiconductor device is no greater than the difference between said peak amplitude levels, and means for controlling the conductivity of said semiconductor control device so as to vary the magnitude of the rectified voltage coupled to said first and second output terminals, thereby varying the output voltage.

15. A voltage control circuit for energization by a source of alternating voltage comprising a transformer having a primary winding and a secondary winding, said source of alternating voltage being connected to said primary winding, said secondary winding having a plurality of terminals which divide it into a plurality of sections, a load, a first full wave bridge rectifying circuit coupled to a section of said secondary winding for providing to said load a rectified voltage of a first peak amplitude level, a second full wave bridge rectifying circuit coupled to a second section of said secondary winding for providing to said load a rectified voltage of a second peak amplitude level, said second bridge rectifying circuit including a part of said first bridge circuit and a first semiconductor control device, a third full wave bridge rectifying circuit coupled to a third section of said secondary winding for providing to said load a rectifying voltage of a third peak amplitude level, said third bridge circuit including a part of said first bridge circuit, said first semiconductor control device and a second semiconductor control device, a fourth full wave bridge rectifying circuit coupled to a fourth section of said secondary winding for providing to said load a rectified voltage of a fourth peak amplitude level, said fourth bridge circuit including a part of said third bridge circuit, said first and second semiconductor control devices and a third semiconductor control device, a fifth full wave bridge rectifying circuit coupled to the entire secondary winding for providing to said load a rectified voltage of a fifth peak amplitude level, said fifth bridge circuit including a part of said third bridge circuit, said first three semiconductor control devices and a fourth semiconductor control device, so that the maximum inverse voltage applied across each of said control devices is no greater than the difference between successive pairs of peak amplitude voltages, and means for controlling the conductivity of said semiconductor devices to selectively switch said five bridge circuits in circuit with said load to provide an output voltage which is the time averaged value of the rectified voltage coupled to said load.

16. A voltage regulator system for providing a direct voltage of rated value to first and second output terminals from a source of unregulated alternating voltage comprising a transformer having a primary and a secondary winding, said alternating voltage being coupled to said primary winding, said secondary winding having a plurality of terminals which divide it into a plurality of sections, a filter circuit having an input and an output terminal, the output terminal of said filter circuit being joined to said first output terminal, a first full wave rectifying circuit including a first and a second pair of diodes for providing to said load full wave rectification of a portion of the voltage induced in said secondary winding of one peak amplitude level, one of said first pair of diodes being coupled between a first winding terminal and the input terminal of said filter circuit, the other diode of said first pair being coupled between a second winding terminal and a bus connection, one diode of said second pair being coupled between a third winding terminal and said filter input terminal and the other diode of said second pair being coupled between a fourth terminal and said bus connection, a second full wave rectifying circuit for providing to said load full wave rectification of another portion of the voltage induced in said secondary winding of another peak amplitude level, including said one diode of each of said first and second pair, a fifth and sixth diode and a semiconductor switching means of predetermined inverse voltage capabilities, said semiconductor switching means coupling said fifth diode between said third winding terminal and said bus connection and coupling said sixth diode between said first winding terminal and said bus connection, so that the maximum inverse voltage applied across said semiconductor means is no greater than the difference between said peak amplitude levels, a load connected between said first and second output terminals, a source of fixed potential of said rated value connected substantially in parallel with said load, a linear dissipative semiconductor device having a voltage thereacross of a predetermined value connected in series between said load and said bus connection so that any deviation of the load voltage from said rated value is initially developed across said dissipative device as a deviation from said predetermined value, a comparator circuit including a comparator transistor, a first control voltage derived from the voltage developed across said dissipative device connected to one electrode thereof, a second control voltage derived from said unregulated alternating voltage source connected to a second electrode thereof, said comparator transistor providing a pulsed control signal whose duty cycle is a function of the relative magnitudes of said control voltages, said control signal being connected to said semiconductor switching means to successively switch the voltages of said first and second full wave rectifying circuits in circuit with said load, whereby the time averaged value of said peak amplitude voltages maintains the voltage across said dissipative device at said predetermined value.

17. A voltage control circuit for energization by a source of alternating voltage comprising a transformer having a primary winding and a secondary winding, said source of alternating voltage being connected to said primary winding, said secondary winding having a plurality of terminals which divide it into a plurality of sections, a load, a first full wave bridge rectifying circuit coupled to a section of said secondary winding for providing to said load a rectified voltage of a first peak amplitude level, a second full wave bridge rectifying circuit coupled to a second section of said secondary winding for providing to said load a rectified voltage of a second peak amplitude level, said second bridge rectifying circuit including a part of said first bridge circuit and a first semiconductor switching device, a third full wave bridge rectifying circuit coupled to a third section of said secondary winding for providing to said load a rectified voltage of a third peak amplitude level, said third bridge circuit including a part of said second bridge circuit, said first semiconductor switching device and a second semiconductor switching device, a first comparator circuit operating at a first voltage level and including a comparator transistor, a first control voltage connected to one electrode thereof, a second control voltage connected to a second electrode thereof, said comparator transistor providing a pulsed control signal whose duty cycle is a function of the relative magnitudes of said first and second control voltages, said control signal being connected to said first semiconductor switching device, a second comparator circuit operating at a second voltage level and including a second comparator transistor, a third control voltage connected to one electrode of said comparator transistor, a fourth control voltage connected to a second electrode of said second comparator transistor, said second comparator transistor providing a second pulsed control signal whose duty cycle is a function of the magnitude of said third and fourth control voltages, said second control signal being connected to said second semiconductor switching device, whereby said first and second semiconductor switching devices are actuated to selectively switch said three bridge circuits in circuit with said load to provide an output voltage which is the time averaged value of the rectified voltage coupled to said load.

18. A voltage control circuit as in claim 3 wherein said controllable means is a semiconductor switching device and wherein said means for controlling the conductivity of said switching device comprises a comparator circuit including a transistor which compares a first control voltage connected to one electrode thereof with a second control voltage connected to a second electrode thereof, said first and second control voltages causing said transistor to intermittently conduct so as to provide to said semiconductor device a pulsed control signal whose duty cycle is a function of the relative magnitudes of said control voltages, said control signal actuating said semiconductor device to successively switch the voltages induced in said first and second output winding portions in circuit with said load, said control circuit further including a source of fixed potential substantially equal to said output voltage and a variable impedance device, said source being connected substantially in parallel with said load, said variable impedance device being connected in series with said load, said first control voltage being a function of the voltage across said variable impedance, whereby the output voltage is maintained equal to said source potential, any fluctuation therefrom initially being developed across said variable impedance and finally compensated by a change in the duty cycle of said control signal.

19. A voltage control circuit for energization by a source of alternating voltage comprising a transformer having a primary winding and a secondary winding, said source of alternating voltage being connected to said primary winding, said secondary winding having a plurality of spaced terminals which divide it into a plurality of sections, a load, each terminal of a pair of terminals being individually coupled by a first diode to one side of said load and individually coupled by a second opposite poled diode to the other side of said load, the remaining terminals each being individually coupled by additional first diodes and at least a single semiconductor control device to one side of said load and by additional second diodes and at least a single semiconductor control device to the other side of said load, there being provided a plurality of full wave bridge rectifying circuits each providing rectified voltages of different peak amplitude levels, and means for selectively controlling the conductivity of said semiconductor devices to selectively switch said full wave bridge rectifying circuits in circuit with said load.

References Cited in the file of this patent

UNITED STATES PATENTS

| | | |
|---|---|---|
| 2,635,219 | Blondet | Apr. 14, 1953 |
| 2,834,931 | Walker | May 13, 1958 |
| 2,959,726 | Jensen | Nov. 8, 1960 |
| 3,040,239 | Walker | June 19, 1962 |